(12) United States Patent
Kloepfer et al.

(10) Patent No.: US 10,183,610 B2
(45) Date of Patent: Jan. 22, 2019

(54) TRAILER WITH PROTECTIVE RAIL AND TIE-DOWN ANCHORS

(71) Applicant: Titan Trailers Inc., Delhi (CA)

(72) Inventors: Michael Kloepfer, Delhi (CA); Rick Lees, Burgessville (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 15/661,560

(22) Filed: Jul. 27, 2017

(65) Prior Publication Data

US 2017/0320526 A1 Nov. 9, 2017

Related U.S. Application Data

(63) Continuation of application No. 15/148,446, filed on May 6, 2016, now Pat. No. 9,745,003.

(60) Provisional application No. 62/165,590, filed on May 22, 2015.

(51) Int. Cl.
*B60P 7/08* (2006.01)
*B60J 7/10* (2006.01)
*B62D 33/04* (2006.01)

(52) U.S. Cl.
CPC ............ *B60P 7/0815* (2013.01); *B60J 7/104* (2013.01); *B60P 7/0807* (2013.01); *B62D 33/044* (2013.01)

(58) Field of Classification Search
CPC .... B60P 7/0815; B60P 7/0807; B62D 33/044; B60J 7/104
USPC ................. 410/101, 102, 104–106, 108–110, 410/114–116; 24/115 K, 265 CD
See application file for complete search history.

(56) References Cited

U.S. PATENT DOCUMENTS

| 4,253,785 | A | 3/1981 | Bronstein | |
|---|---|---|---|---|
| 5,480,180 | A | 1/1996 | Fuller et al. | |
| 6,113,328 | A | * | 9/2000 | Claucherty ........... B60P 7/0807 410/106 |
| 6,848,873 | B1 | * | 2/2005 | Husk ..................... B60P 3/079 410/115 |
| 6,887,021 | B1 | | 5/2005 | Herring |
| 9,745,003 | B2 | * | 8/2017 | Kloepfer ............... B60P 7/0815 410/115 |

OTHER PUBLICATIONS

U.S. Appl. No. 15/148,446, Notice of Allowance dated Jun. 6, 2017.
U.S. Appl. No. 15/148,446, Office Action dated Feb. 10, 2017.
U.S. Appl. No. 15/148,446, Restriction Requirement dated Dec. 14, 2016.

* cited by examiner

*Primary Examiner* — Stephen T Gordon
(74) *Attorney, Agent, or Firm* — Borden Ladner Gervais LLP

(57) ABSTRACT

A protective rail for a trailer is formed of an extension or ridge projecting outwardly from a wall of the trailer and extending along at least a part of a length of the wall. The protective rail is provided with tie-down anchors for coupling with tie-downs having couplers such as rings, eyes, or loops. The anchors may tongues formed in the protective rail when the protective rail is cut-out at selected locations along the protective rail. The anchors may be sized and shaped such that the surrounding portion of the protective rail prevents or tends to prevent other trailers or objects contacting the protective rail from damaging or becoming caught on the anchors.

20 Claims, 5 Drawing Sheets

TRAILER WITH PROTECTIVE RAIL AND TIE-DOWN ANCHORS

CROSS REFERENCE TO RELATED APPLICATIONS

This application is a continuation of U.S. patent application Ser. No. 15/148,446 filed May 6, 2016 which claims the benefit of U.S. Provisional Patent Application No. 62/165,590 filed May 22, 2015, the contents of which are incorporated herein by reference.

FIELD

The present disclosure relates generally to top-loadable cargo trailers.

BACKGROUND

Trailers are widely used to transport various materials. For example, tipper trailers and walking floor trailers are widely used to transport particulate bulk material such as gravel, stone, grain, and road salt. Dump trailers are also used for transporting such material, as well as other material such as garbage.

Some trailers have a top opening for loading of materials into the trailer. A tarp or other sheet covering is commonly used to cover the top opening of the trailer while the trailer is towed to the materials' destination. Tie-downs such as bungees, ropes, or straps are commonly used to tie down the tarp to secure it in place while the trailer is in motion. The tie-downs typically end with a hook on each end to be hooked to some anchor such as a tie-down ring integral with or affixed to the trailer, or simply to a convenient part of the trailer. Tarps are sometimes provided with eyelets for this purpose, such that one end of a tie-down is hooked into the tarp eyelet while the other end of the tie-down is hooked to an anchor on the trailer. In some applications, the tie-downs have a length sufficient to be anchored at one end of the tie-down on one side or end of the trailer, passed over the top of the trailer, and anchored at another end of the tie-down on another side or end of the trailer, wherein a body of the tie-down holds the tarp in place.

The use of tie-downs with hooks presents a hazard, however. When the tie-down is released, or comes loose, there is a risk that the tie-down will flail uncontrollably whipping a hook about the trailer, causing damage to persons or objects about the trailer.

Another deficiency or weakness of conventional trailers is the risk of damage to their sidewalls. Cargo trailers are typically brought into close proximity with other trailers or other hard structures or objects which may bump or grind against the sidewall of the trailer causing damage.

There is therefore a material value in addressing the above deficiencies of conventional open-top trailers and tarp tie-down methods.

BRIEF DESCRIPTION OF THE DRAWINGS

Embodiments will now be described, by way of example only, with reference to the attached Figures.

DESCRIPTION

Figure 1:
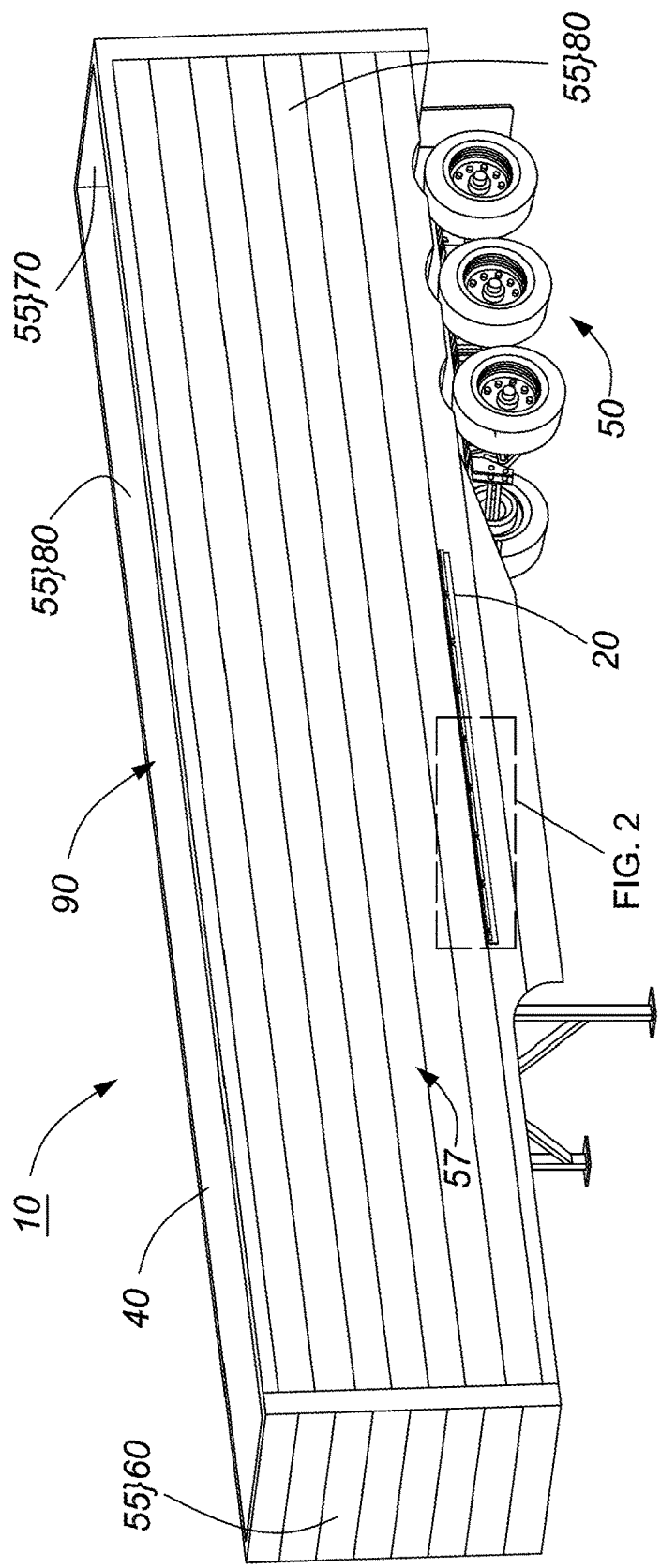
FIG. 1 is drawing of a trailer having a protective rail on a sidewall of the trailer.

An open-top trailer 10 with a protective rail 20 and tie-down anchors 30 is shown in FIGS. 1-4. The trailer has a container 40 supported by a wheeled suspension 50. The container 40 has a number of walls 55 including a front wall 60, an end wall 70 or tailgate, and opposing sidewalls 80, together defining a top opening 90.

The protective rail 20 may be integral with, or mounted on, a wall 55 of the container 40, which may be a sidewall 80, end wall 70, or front wall 60 of the container 40, and may extend partway or substantially an entire length of the wall 55. When mounted, the protective rail 20 may be mounted on the wall 55 using and suitable means including for example fasteners or welds. The protective rail 20 may have a flange or other mounting structure for cooperation with the fasteners or welds for mounting the protective rail 20.

The protective rail 20 may form a ridge 25 extending along the length of the wall, and extending or projecting outwardly from a face 57 or outward surface of the wall 55 of the container 40, such that other trailers or objects in proximity to the trailer 10, and at a height of the protective rail 20, are likely to come into contact with the protective rail 20 before contacting the face 57 of the wall 55.

Figure 4:
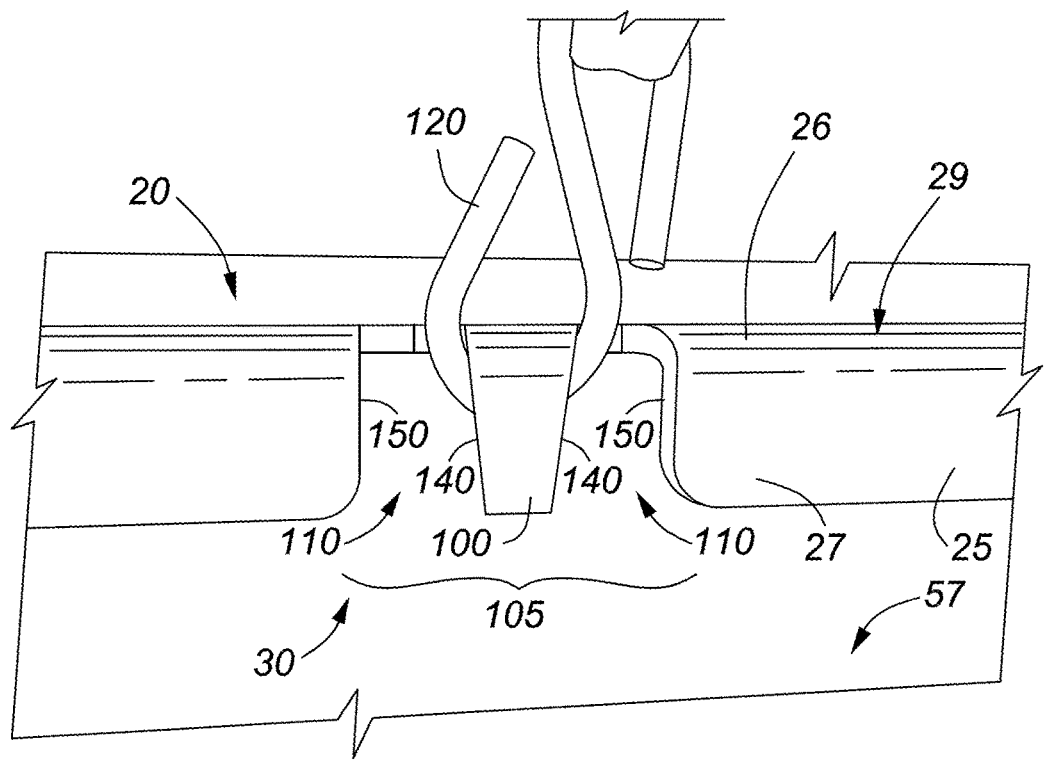
FIG. 4 is an enlarged view of a portion of FIG. 3 showing the engagement of the eye of the tie-down and the tie-down anchor.

As shown in FIG. 4, the ridge 25 may have a bend 26 integrally formed at an outermost reach of the ridge 25 from the face 57 of the wall 55. The ridge 25 may have an integral lip 27 extending downwardly from the bend 26. The lip 27 may extend downwardly and inwardly toward the face 57 of the wall 55, to approach or veer toward the face 57. In this way, the ridge 25 may be substantially shaped like the numeral '7', wherein an upper portion of the shape extends from the face 57 of the wall 55, which may including extending substantially perpendicularly from the face 57 of the wall 55. The ridge 25 may provide an outer edge 29 of the bend 26 which has a maximum outward projection, spacing, or displacement from the face 57 of the wall 55, such that other trailers or objects in proximity to the trailer 10 and at about a height of the protective rail 20 are likely to come into contact first with the outer edge 29 of the bend 26.

Figure 2:
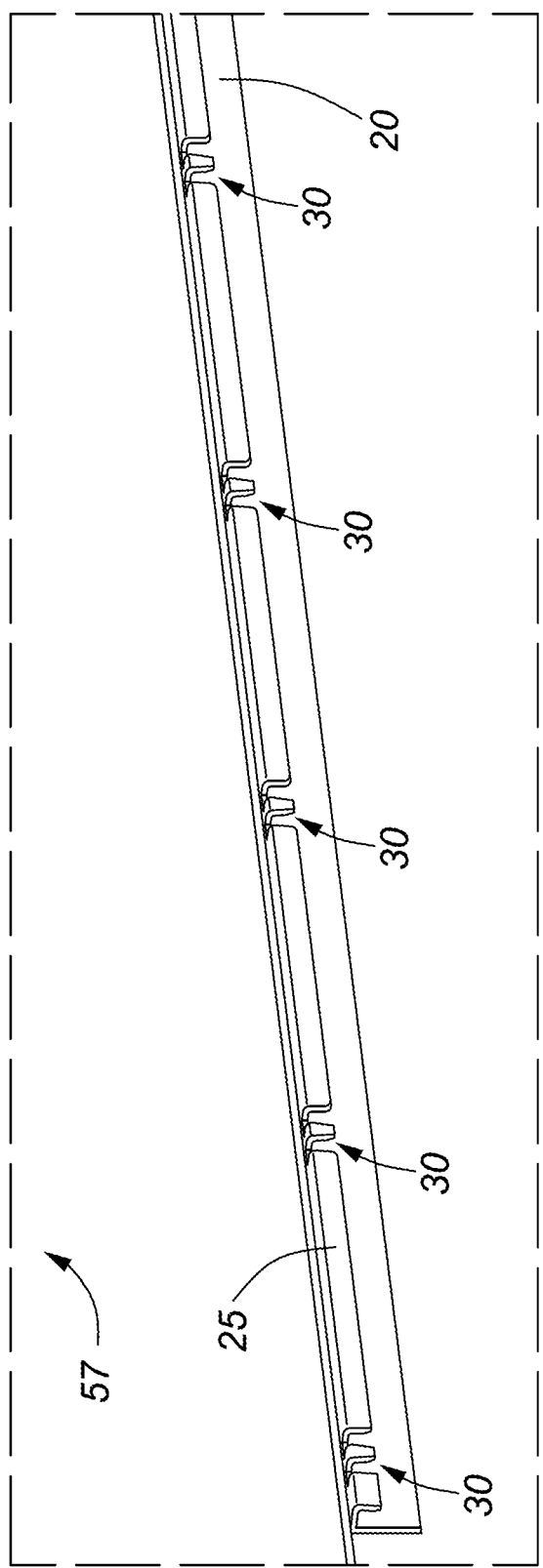
FIG. 2 is an enlarged view of a portion of FIG. 1 showing the protective rail.
Figure 3:
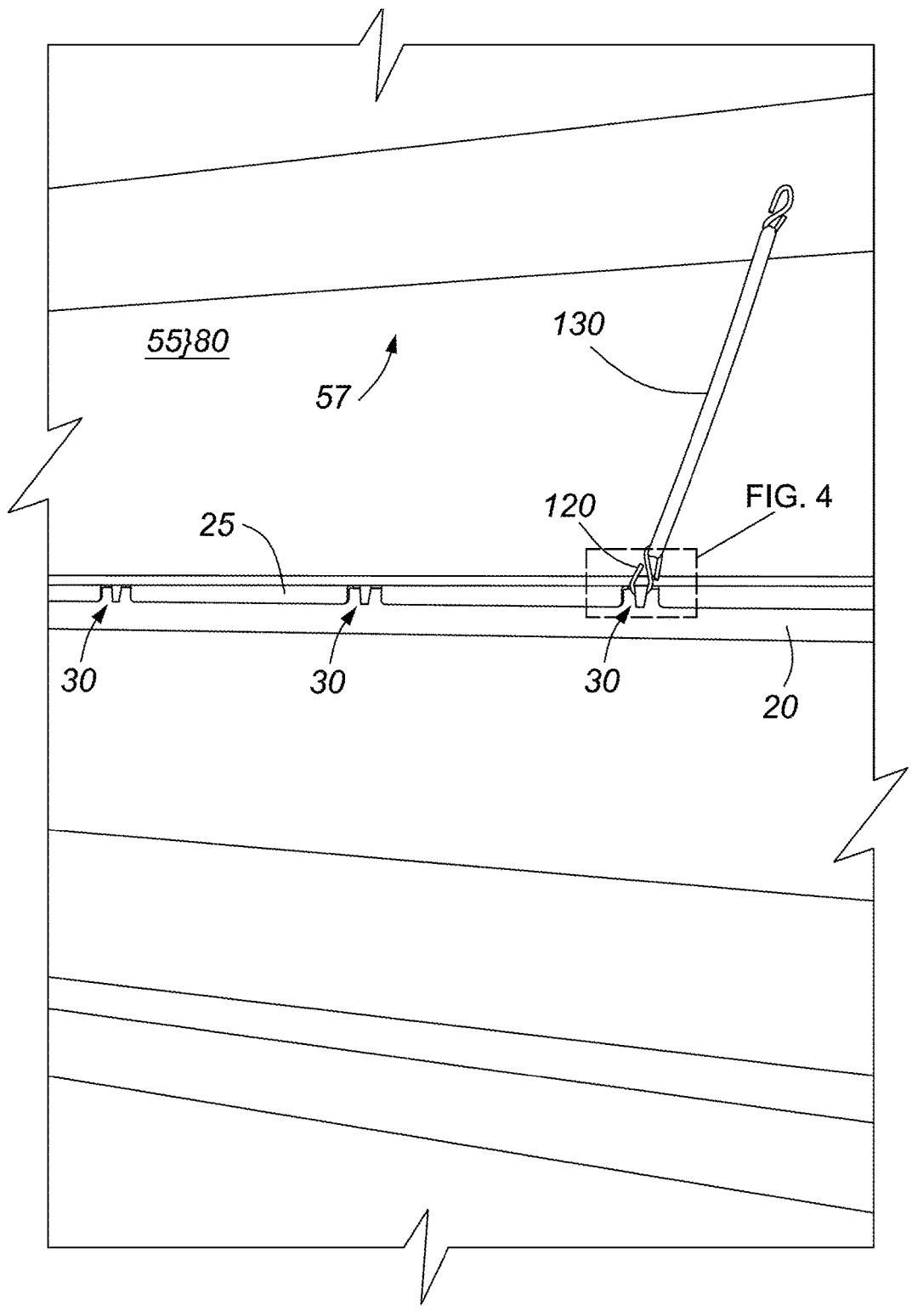
FIG. 3 is a drawing showing a partial view of the trailer with protective rail of FIG. 1, showing an eye of a tie-down engaged with a tie-down anchor of the protective rail.

With reference to FIGS. 2-4, the protective rail 20 may be provided at at least one location along its length with one or more tie-down anchors 30. Each tie-down anchor 30 may include a downwardly-extending tongue 100, knob, catch, or other such structure formed in the protective rail 20 or mounted or integral with the wall 55. The protective rail 20 may have a gap 105 or space where the tie-down anchor 30 is located. In particular, tie-down anchor 30 may be formed by adjacent notches 110 in the ridge 25 to provide the downwardly-extending tongue 100 shaped for engagement with a coupler 120 such as an eye or loop of a tie-down 130 to extend the tie-down 130 upwardly for securing a covering to enclose the top opening 90 of the container 40. Adjacent proximal edges 140 of the notches 110 respectively define lateral edges of the tongue 100, and the lateral edges are respectively spaced by the notches 110 from distal edges 150 of the notches.

The tie-down anchor 30 may be sized and shaped such that its outward extension from the face 57 of the wall 55 is less than or equal to that of the protective rail 20 including the ridge 25. For example, the ridge 25 and the tongue 100 may be defined by a common curved surface formed by a contour extended along a length of the wall 55. The tie-down anchor 30 may also be sized and shaped so as to provide a predetermined limited clearance about the tie-down anchor 30 within the gap 105 or space, relative to edges or walls of the protective rail 20 which define the gap 105 or space. In this way, the surrounding portion of the protective rail 20 may prevent or tend to prevent stray objects from catching on the tie-down anchor 30 unintentionally, which may be by deflecting them from the tie-down anchor 30.

The protective rail 20 may be provided with any desired number of tie-down anchors 30 at any desired locations along its length.

The tie-down anchors 30 may be useful with tie-downs 130 such as bungees, ropes, straps, or other such means, having at at least one corresponding end a coupler 120 such as a ring, eye, or loop sized and shaped for engagement with the tie-down anchor 30 thereby to couple the coupler 120 to the tie-down anchor 30 and secure the tie-down 130 to the tie-down anchor 30. By providing the tie-down anchors 30, tie-downs 130 with such couplers 120 such as rings, eyes, or loops may be used instead of hooks, thereby eliminating or reducing the risks associated with the use of tie-downs having hooks.

A trailer 10 including the protective rail 20 with tie-down anchors 30 may be used with the tie-downs 130 including the couplers 120 as a system.

Figure 5:
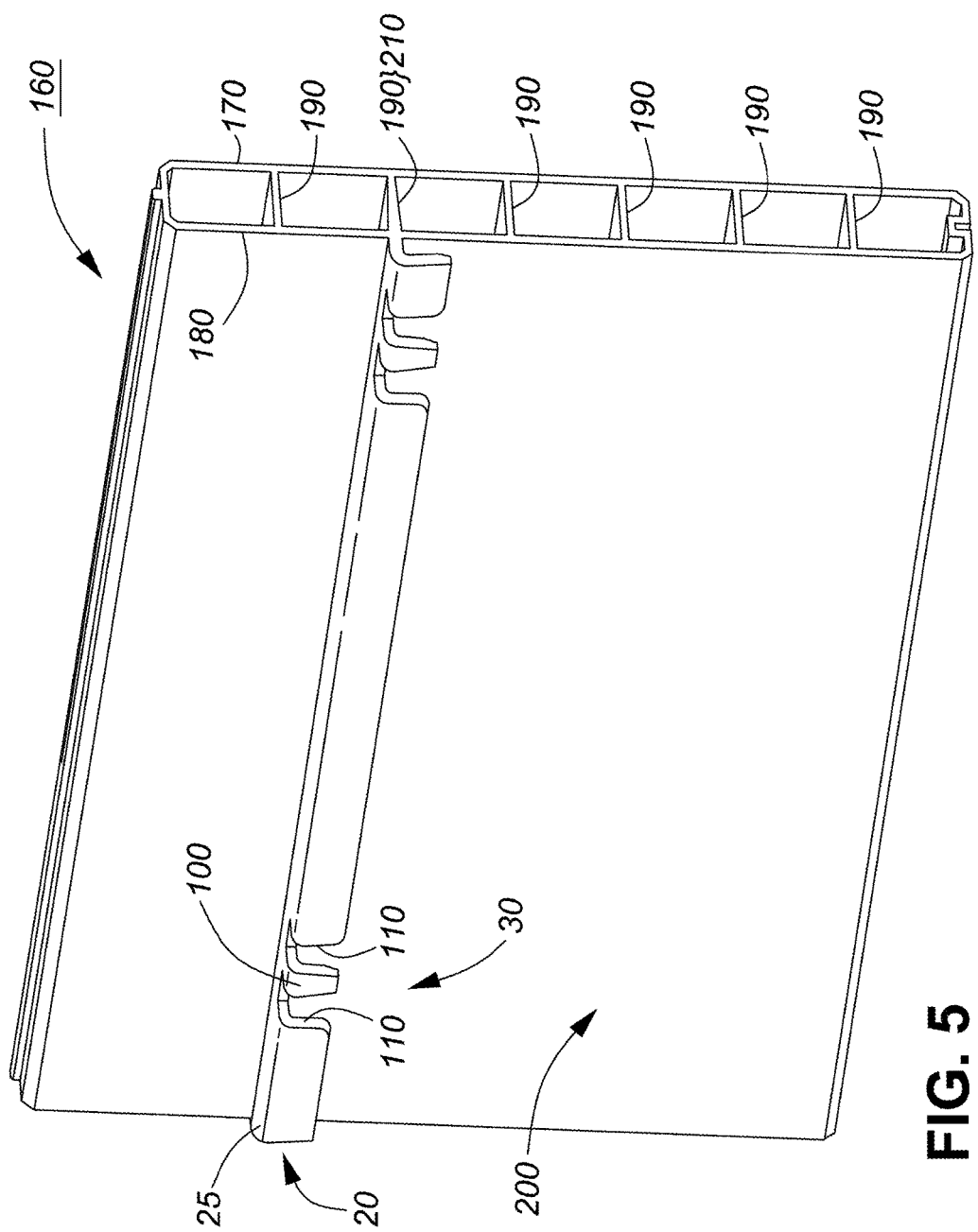
FIG. 5 is a drawing of a sidewall panel having an integral protective rail.

The protective rail 20 may form a separate component mountable to the wall 55 of the trailer 10 by any suitable means such as fasteners, such as bolts or screws, or welds. Alternatively, the protective rail 20 may be formed integrally with the wall 55. For example, in some embodiments the wall is formed of horizontal extruded panels, which may be the extruded panel 160 as shown in FIG. 5, which may be an extruded aluminum panel. The extruded panel 160 may be extruded with a profile including the protective rail 20. The notches 110 forming the tongue 100 of the tie-down anchors 30 may be provided in the ridge 25 of the protective rail 20 by any suitable means such as cutting or punching. As shown in FIG. 5, the extruded panel 160 may have an inner skin 170 and an outer skin 180 joined by a number of webs 190, or ribs, traversing a gap between the inner skin 170 and the outer skin 180. An outward surface 200 of the outer skin 180 may form the face 57 of the wall 55 when the wall 55 is constructed from such extruded panels 160. The ridge 25 of the protective rail 20 may be formed as an extension of a particular web 210 selected from the webs 190 spanning the inner skin 170 and outer skin 180. In such case, the extension projects outwardly from the face 57 of the wall 55. The profile, and generally the construction, of the extruded panel 160 may be varied according to the parameters of the particular application, and may, for instances, be constructed with any desired thicknesses or other dimensions. For example, the extruded panel 160 may be a tongue-and-groove panel, as shown in FIG. 5.

The protective rail 20 may be provided at any desired height on the trailer 10, which may be based on experiment or trial and error, and may be at a height where the trailer 10 frequently comes into contact with other trailers or objects or structures which move about the trailer during its expected and ordinary use. For example, the ridge 25 may have a contoured shape with an outermost curved edge, for contacting and deflecting objects for preventing contact by the objects with the face 57 of the wall 55 and to deflect the objects from the tie-down anchors 30 to prevent accidental snagging of the objects by the tie-down anchors 30. The protective rail 20 may also be provided at a height wherein it is convenient to couple the coupler 120 of the tie-downs 130 without requiring the use of additional equipment such as a ladder or platform.

The protective rail 20 may be formed of any suitable materials, including for example, steel or aluminum, by any manufacturing suitable processes, including for example extrusion.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A trailer comprising:
   a container supported by a wheeled suspension, the container comprising two opposing sidewalls defining a top opening; and
   on at least one of the opposing sidewalls:
      a protective rail extending along a length of the sidewall, the protective rail comprising a mounting flange mounted to a vertical face of the sidewall between a top edge and a bottom edge of the sidewall, and an integral ridge projecting outwardly from the face of the sidewall, wherein the protective rail is provided entirely between the top edge and the bottom edge of the sidewall; and
      a plurality of tie-down anchors, wherein each tie-down anchor is formed by adjacent notches in the ridge to provide a downwardly-extending tongue shaped for engagement with an eye or hook of a tie-down to extend the tie-down upwardly for securing a covering to enclose the top opening of the container,
      wherein the ridge is provided on the sidewall at a predetermined height between the top edge and the bottom edge of the sidewall, and has a contoured shape with an outermost curved edge, for contacting and deflecting objects for preventing contact by the objects with the face of the sidewall and to deflect the objects from the tie-down anchors to prevent accidental snagging of the objects by the tie-down anchors.

2. A trailer comprising:
   a container supported by a wheeled suspension, the container comprising a wall;
   a protective rail extending along at least part of a length of the wall, the protective rail comprising a mounting flange mounted at a substantially vertical face of the wall between a top edge and a bottom edge of the wall, and an integral ridge projecting outwardly, away from a container interior, from the face of the wall between the top edge and the bottom edge of the wall; and
   a plurality of tie-down anchors, wherein each tie-down anchor comprises a tongue formed in the ridge, shaped for engagement with an eye or hook of a tie-down, and extending downwardly away from the top edge of the wall.

3. The trailer according to claim 2, wherein each tie-down anchor is formed by adjacent notches in the ridge to provide the tongue between the notches, wherein adjacent proximal edges of the notches respectively define lateral edges of the tongue, and the lateral edges are respectively spaced by the notches from distal edges of the notches.

4. The trailer according to claim 2, wherein the protective rail is provided entirely between the top edge and the bottom edge of the wall.

5. The trailer according to claim 2, wherein the protective rail is provided nearer the bottom edge of the wall than the top edge of the wall.

6. The trailer according to claim 2, wherein the ridge further comprises a bend integrally formed at an outermost reach of an extension of the ridge from the face of the wall.

7. The trailer according to claim 6, wherein the ridge further comprises an integral lip extending downwardly, away from the top edge of the wall, from the bend.

8. The trailer according to claim 7, wherein the lip extends downwardly, away from the top edge of the wall, and inwardly, toward the container interior, to approach the face of the wall, and an outer edge of the bend has a maximum outward projection from the face of the wall.

9. The trailer according to claim 7, wherein the ridge is substantially shaped like a numeral 7, wherein an upper portion of the numeral 7 extends substantially perpendicularly from the face of the wall.

10. The trailer according to claim 2, wherein the protective rail is provided on the wall at a predetermined height for contacting objects and for preventing contact by the objects with the face of the wall.

11. The trailer according to claim 10, wherein the predetermined height is between the top edge of the wall and the bottom edge of the wall.

12. The trailer according to claim 10, wherein the protective rail is operative to contact the objects to deflect the objects from at least one of the tie-down anchors to prevent accidental snagging of the objects by the tie-down anchor.

13. The trailer according to claim 3, wherein the ridge and the tongue of each tie-down anchor are defined by a curved surface formed by a contour extended along the length of the wall, and the tongue is provided entirely within the curved surface.

14. The trailer according to claim 2, wherein the protective rail is formed of extruded aluminum.

15. The trailer according to claim 2, wherein the protective rail is fastened to the face of the wall.

16. The trailer according to claim 2, wherein the protective rail is welded to the face of the wall.

17. The trailer according to claim 3, wherein the container has a top opening, and wherein the tongue of each tie-down anchor projects downwardly for engagement with the eye or hook of the tie-down to extend the tie-down upwardly for securing a covering to enclose the top opening of the container.

18. The trailer according to claim 2, wherein the wall is a sidewall of the container.

19. The trailer according to claim 2, wherein the vertical face comprises an outward surface of the wall facing away from the container interior.

20. The trailer according to claim 2, wherein the tie-down anchors extend generally parallel to one another.

* * * * *